(12) United States Patent
Porte et al.

(10) Patent No.: US 12,023,879 B2
(45) Date of Patent: Jul. 2, 2024

(54) METHOD FOR MANUFACTURING DEICING ACOUSTIC SKIN FOR AN AIRCRAFT ACOUSTIC PANEL, USING A FIBER SPACING DEVICE

(71) Applicant: AIRBUS OPERATIONS S.A.S., Toulouse (FR)

(72) Inventors: Alain Porte, Colomiers (FR); Jacques Lalane, Saint Orens de Gameville (FR); Hassan Menay, Nantes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 662 days.

(21) Appl. No.: 16/584,555

(22) Filed: Sep. 26, 2019

(65) Prior Publication Data

US 2020/0101681 A1 Apr. 2, 2020

(30) Foreign Application Priority Data

Oct. 1, 2018 (FR) ...................................... 1859048

(51) Int. Cl.
*B29C 70/54* (2006.01)
*B29C 65/02* (2006.01)
(Continued)

(52) U.S. Cl.
CPC ............ *B29C 70/882* (2013.01); *B29C 65/02* (2013.01); *B29C 70/545* (2013.01); *B32B 37/06* (2013.01);
(Continued)

(58) Field of Classification Search
CPC .. B29C 70/545; B32B 37/06; B32B 2038/047
See application file for complete search history.

(56) References Cited

U.S. PATENT DOCUMENTS 5,246,520 A * 9/1993 Scanlon ................ B29C 70/504
156/252
5,252,279 A * 10/1993 Gore ...................... B29C 70/545
264/225

(Continued)

FOREIGN PATENT DOCUMENTS

EP 0573353 A1 12/1993
EP 0611741 A1 8/1994
(Continued)

*Primary Examiner* — Scott W Dodds
(74) *Attorney, Agent, or Firm* — Greer, Burns & Crain, Ltd.

(57) ABSTRACT

A method for manufacturing deicing acoustic skin for an aircraft acoustic panel, using a fiber spacing device. The manufacturing method includes at least one step for manufacturing a layer assembly having a deicing layer supplied with electrically conductive fibers embedded in a resin and two insulating layers arranged on either side of the deicing layer, and a baking step. The method provides for fitting, during baking, a spacing device on the layer assembly, the spacing device having pins passing through said layer assembly, perforations being produced at the locations of the pins after the withdrawal of the spacing device, the fitting of the spacing device making it possible to produce perforations with desired sizes and shapes, in a simple and effective manner, and with a reduced manufacturing duration.

12 Claims, 5 Drawing Sheets

(51) Int. Cl.
*B29C 70/88* (2006.01)
*B32B 37/06* (2006.01)
*B64D 33/02* (2006.01)
*B32B 38/04* (2006.01)

(52) U.S. Cl.
CPC ........ *B64D 33/02* (2013.01); *B32B 2038/047* (2013.01); *B32B 2305/02* (2013.01); *B32B 2305/07* (2013.01); *B32B 2305/38* (2013.01); *B32B 2313/04* (2013.01); *B64D 2033/0206* (2013.01); *B64D 2033/0233* (2013.01)

(56) References Cited

U.S. PATENT DOCUMENTS

| | | | | |
|---|---|---|---|---|
| 7,484,593 | B2* | 2/2009 | Braun | G10K 11/172 |
| | | | | 181/290 |
| 2002/0139899 | A1* | 10/2002 | Porte | B64D 15/04 |
| | | | | 244/134 B |
| 2008/0179448 | A1* | 7/2008 | Layland | H05B 3/28 |
| | | | | 244/1 N |
| 2009/0263627 | A1 | 10/2009 | Hand et al. | |
| 2016/0076453 | A1* | 3/2016 | Richter | F02C 7/24 |
| | | | | 181/292 |

FOREIGN PATENT DOCUMENTS

| | | |
|---|---|---|
| EP | 0796829 A1 | 9/1997 |
| EP | 1495963 A2 | 1/2005 |
| EP | 1715159 A1 | 10/2006 |
| EP | 1826119 A2 | 8/2007 |
| EP | 1845018 A2 | 10/2007 |
| EP | 1925551 A1 | 5/2008 |
| FR | 2898868 A1 | 9/2007 |
| FR | 2934566 A1 | 2/2010 |
| FR | 2935356 A1 | 3/2010 |
| FR | 3001452 A1 | 8/2014 |
| GB | 885131 A | 12/1961 |
| WO | 2010061140 A1 | 6/2010 |

* cited by examiner

METHOD FOR MANUFACTURING DEICING ACOUSTIC SKIN FOR AN AIRCRAFT ACOUSTIC PANEL, USING A FIBER SPACING DEVICE

CROSS-REFERENCE TO PRIORITY APPLICATION

This application claims the benefit of, and priority to, French patent application number 1859048, filed Oct. 1, 2018. The content of the referenced application is incorporated by reference herein.

TECHNICAL FIELD

Embodiments of the subject matter described herein relate generally to a method for manufacturing a deicing acoustic skin. This acoustic skin is preferably intended for an acoustic attenuation panel for an aircraft, and in particular for a jet engine nacelle cowl of an aircraft.

BACKGROUND

It is known that, on an aircraft, for example on a transport plane, substantial noise is often produced, particularly via the propulsion assemblies (or jet engines) of the aircraft. It is known, in order to reduce the sound effect produced by the jet engines of the aircraft, to provide, in particular at the nacelles of the jet engines, walls supplied with panels having good sound absorption. Conventionally, an acoustic attenuation panel, called acoustic panel hereafter, generally comprises an acoustic structure. This acoustic structure often includes a cellular structure, in particular as honeycomb, and is equipped on the two faces thereof with an acoustic skin also called resistive skin which is perforated and with a non-perforated backing skin, respectively. The acoustic panel is arranged such that the acoustic skin is located in proximity to the source of noise, particularly upstream and/or downstream of the fan in the case of an aircraft jet engine, in order to achieve effective absorption of the noise generated upstream and downstream of the fan.

Furthermore, to provide a deicing function, for example for an air intake of a jet engine, the acoustic skin must be configured to also be a deicing skin.

Several conventional processes exist for forming a perforated acoustic skin (or resistive skin), particularly for the purpose of obtaining a desired proportion of perforation.

A conventional process consists in assembling the acoustic skin separately after baking, after having previously perforated it by stamping or by any other means (mechanical, laser, etc.).

According to another conventional process, it is also possible to perforate the acoustic skin once the piece is finished (which makes it possible to obtain the desired proportion of perforation), but generally only round holes are created by mechanical perforation.

With these conventional processes, the perforations (or holes) are generally circular in order to simplify manufacture and reduce cost. However, this type of perforation is optimal neither for the acoustic function, nor for the structural function (compared to oblong perforations for example).

Moreover, in order to implement a deicing function (for a jet engine air intake for example), in an electrical manner, it is known to connect the fibers (particularly made of carbon) making up the acoustic (or resistive) skin to an electric source such as to deice the surface in question by Joule effect. However, to avoid any risk with the outer environment and to prevent the handling risks linked to electricity, it is necessary to be able to electrically insulate the carbon fibers at the acoustic perforations. Fitting such electric insulation is complex and long.

The aforementioned processes for manufacturing an acoustic skin, in addition to having disadvantages in terms of cost, complexity and time of manufacture, cannot be used to form an acoustic skin which must also be a deicing skin.

BRIEF SUMMARY

The present disclosure aims to overcome these disadvantages. It relates to a method for manufacturing a deicing acoustic skin, in particular for an acoustic attenuation panel of an aircraft, which makes it possible to manufacture a deicing acoustic skin in a simple and precise manner and at a reduced cost.

According to the disclosure, said manufacturing method includes:

- a manufacturing step that involves manufacturing a layer assembly comprising a plurality of stacked layers, the layer assembly comprising at least one deicing layer and two insulating layers arranged on either side of this deicing layer, the deicing layer comprising electrically conductive fibers embedded in a resin;
- a spacing step that involves fitting a spacing device on the layer assembly, the spacing device comprising a plurality of pins, the fitting of the spacing device including passing said pins through said layer assembly;
- a baking step that involves submitting the assembly formed from the layer assembly and from the spacing device to baking, in order to polymerize the layer assembly; and
- a withdrawal step that involves removing the spacing device from the polymerized layer assembly such as to obtain an acoustic skin supplied with a plurality of perforations, said perforations being produced at the locations of the pins after the withdrawal of the spacing device.

Thus, the manufacturing method makes it possible to form an acoustic skin which is also a deicing skin. Moreover, as specified hereafter, the manufacturing method makes it possible to retain an insulating material around the (electrically conductive) fibers at the perforations, and this provides continuity of the deicing function (implemented by these fibers) and makes it possible to not have exposed fibers.

Thus, thanks in particular to the fitting of the spacing device, the manufacturing method makes it possible to produce perforations with desired sizes and shapes, in a simple and effective manner, and with a reduced manufacturing duration.

Advantageously, the spacing device comprises at least one plate comprising two faces, said pins being arranged to project on one of said faces of the plate.

Furthermore, advantageously, each of said pins has an elongated shape comprising a first longitudinal end through which the pin is fixed to the plate and a second longitudinal end supplied with a point, and each of said pins comprises, between the first and second longitudinal ends, a shank having a substantially constant cross-section.

Moreover, advantageously, for at least some of said pins:
- the cross-section of the shank has a surface enclosed in a circle with a diameter of between 0.8 and 1 millimeter; and/or the cross-section of the shank has one of the following shapes: round, polygonal, oblong, elliptical, water drop-shaped.

Furthermore, advantageously:

the layer assembly includes an auxiliary layer supplied with a mesh ("wiremesh"), for example metal or polymer: and/or the fibers of the deicing layer are made of carbon.

In a specific embodiment, the number and the surface of the cross-section of the pins on the plate are suitable for creating a number and a size of perforations in the acoustic skin making it possible to give said acoustic skin a preferred sound absorption in at least one given range of acoustic frequencies.

Moreover, advantageously, the spacing device includes at least two different zones, the number and the surface of the cross-section of the pins on a first of said zones being suitable for giving a first part of the acoustic skin a preferred sound absorption in at least one first range of acoustic frequencies, and the number and the surface of the cross-section of the pins on the second of said zones being suitable for giving a second part of the acoustic skin a preferred sound absorption in at least a second range of acoustic frequencies, said second range of acoustic frequencies being different to said first range of acoustic frequencies.

Moreover, advantageously, the spacing step includes producing a relative movement between the spacing device and the layer assembly such as to fit the spacing device.

Furthermore, advantageously, the spacing step includes producing perforations with a reduced surface at a so-called aerodynamic face of the layer assembly, with respect to the interior of the layer assembly.

The present disclosure also relates to a deicing acoustic skin, obtained by implementing a manufacturing method such as that described above.

The present disclosure furthermore relates to a process for manufacturing an acoustic panel including an acoustic structure supplied with a cellular structure, with a deicing acoustic skin and with a backing skin.

According to the disclosure, said manufacturing process includes a manufacturing method such as that described above, which is implemented at least in order to manufacture said acoustic skin.

In a first preferred embodiment, the manufacturing process includes at least the plurality of following successive operations:

an operation for manufacturing the deicing acoustic skin, by implementing said manufacturing method;

an operation for manufacturing the cellular structure;

an operation for manufacturing the backing skin; and an operation for fixing the deicing acoustic skin and the backing skin on either side of the cellular structure.

Furthermore, in a second embodiment, the manufacturing process is such that:

the manufacturing step of said manufacturing method includes manufacturing a single-piece assembly comprising a cellular structure, a backing skin and a deicing acoustic skin, said deicing acoustic skin corresponding to said layer assembly; and the baking step of said manufacturing method includes baking the resulting single-piece assembly in order to obtain the acoustic structure which is made as a single piece.

The present disclosure also relates to an acoustic panel, obtained by implementing a manufacturing process such as that described above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The appended figures will clearly explain embodiments of the invention. In these figures, identical references refer to similar elements. More specifically.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
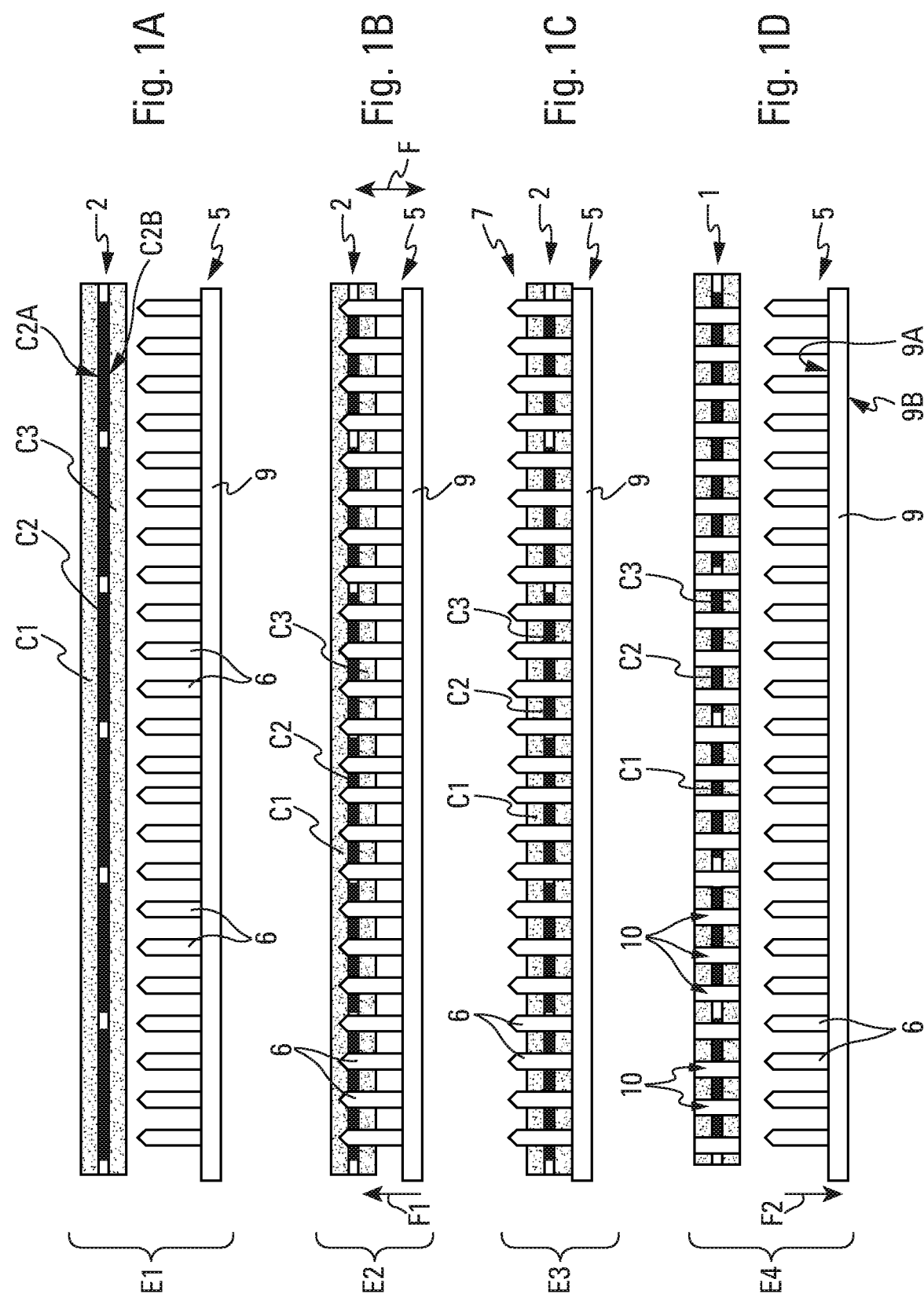
FIGS. 1A, 1B, 1C and 1D are schematic views, in section, of a layer assembly and of a spacing device during the implementation of successive steps, respectively, of a method for manufacturing a deicing acoustic skin.
Figure 2:
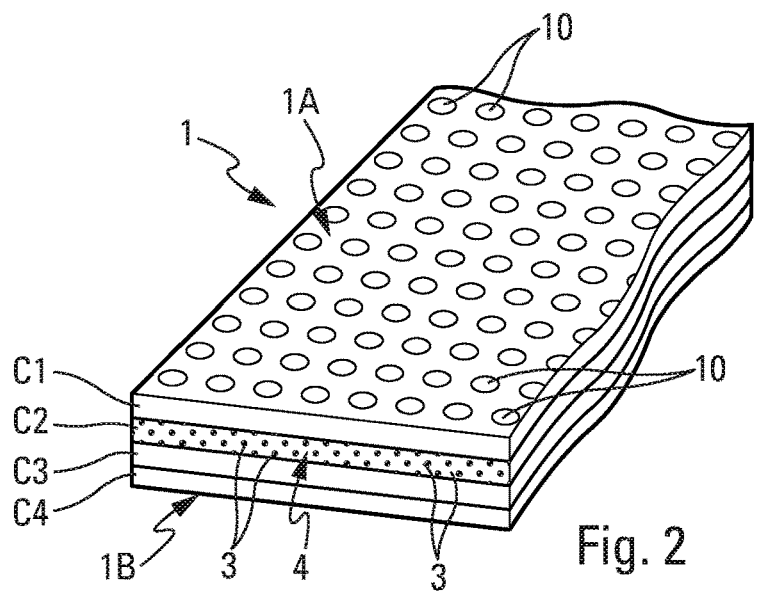
FIG. 2 is a perspective, partial and schematic view of a deicing acoustic skin.

The manufacturing method, represented schematically in FIG. 1 as a specific embodiment, is intended to manufacture a deicing acoustic skin 1, as represented for example in FIG. 2.

Although not exclusively, this acoustic skin 1 is intended more particularly to be part of an acoustic panel 20 (or acoustic attenuation panel), as specified below with reference to FIG. 7.

The acoustic skin 1 is supplied with a plurality of perforations (or holes, recesses, openwork) 10, passing right through said acoustic skin 1, between the faces 1A and 1B of said acoustic skin 1, said perforations 10 being represented by round shapes in FIG. 2 in particular. The acoustic skin 1 thus has a permeability to air, and therefore sound, at least to sound that needs to be attenuated by said acoustic skin 1. Sound absorption is thus achieved by the acoustic skin 1 by means of said perforations 10. Furthermore, the acoustic skin 1 comprises a partially integrated deicing (or heat generating) system 11, making it possible to implement a deicing function, as specified below with reference to FIG. 6.

According to the disclosure, said manufacturing method includes, as represented in FIGS. 1A to 1D, respectively, a plurality of successive steps E1 to E4. More precisely, the manufacturing method includes:
- a manufacturing step E1 that includes manufacturing a layer assembly 2. This layer assembly 2 comprises a plurality of stacked layers C1, C2 and C3. The layer assembly 2 comprises, at least, a deicing layer C2 and two insulating layers C1 and C3 which are arranged on either side of this deicing layer C2. These insulating layers C1 and C3 are produced from an electrically insulating material. As represented in FIG. 1A, the insulating layer C1 is arranged on a face C2A of the deicing layer C2 and the insulating layer C3 is arranged on a face C2B of the deicing layer C2, opposite said face C2A. The deicing layer C2 is supplied with a plurality of electrically conductive fibers 3 which are embedded in a (insulating) resin 4, as is represented in FIG. 2;
- a spacing step E2 that involves fitting a spacing device 5 on the layer assembly 2. The spacing device 5 comprises a plurality of pins 6, as is specified below. Fitting the spacing device 5 on the layer assembly 2 includes passing said pins 6 of the spacing device 5 through said layer assembly 2, as is also specified hereafter;
- a baking step E3 involves subjecting the assembly 7 formed from the layer assembly 2 and from the spacing device 5 to baking, in order to polymerize the layer assembly 2; and
- a withdrawal step E4 includes removing the spacing device 5 from the polymerized layer assembly 2, i.e. removing the pins 6 from the polymerized layer assembly 2, such as to obtain an acoustic skin 1 supplied with a plurality of perforations 10 passing through the acoustic skin 1. The perforations 10 are formed at the locations of the pins 6 after withdrawal of the latter from the layer assembly 2.

The fibers 3 can be produced from various electrically conductive materials. Preferably, these fibers 3 are made from carbon. The resin 4 can be produced from various materials such as, for example, glass or a thermoplastic resin. Likewise, the electrically insulating material of the insulating layers C1 and C3 can be produced from various materials and particularly from glass.

In a specific embodiment, the manufacturing step E1 involves manufacturing a layer assembly 2 comprising, in addition to said layers C1 to C3, one or more auxiliary layers, as is represented by way of illustration with respect to an auxiliary layer C4 in FIG. 2. The auxiliary layer C4 can be located at various positions with respect to the other layers C1 to C3.

By way of example, the layer assembly 2 can include an auxiliary layer supplied with a mesh ("wiremesh"), for example metal or polymer that is very finely woven such as to be sound-permeable, while particularly making it possible to limit the aerodynamic interactions and to reduce drag.

Moreover, the spacing step E2 includes producing a relative movement between the spacing device 5 and the layer assembly 2, as is illustrated by a double arrow F in FIG. 1B such as to fit the spacing device 5 in the position represented in FIG. 1C.

For this purpose, in a preferred embodiment, a conventional movement unit (not represented) is provided in order to move the spacing device 5 toward the layer assembly 2 which is immobile, as is illustrated by an arrow F1 in FIG. 1B. In an alternative, it is also possible to provide a conventional movement unit in order to move the layer assembly 2 toward the spacing device 5 which is immobile.

Figure 3:
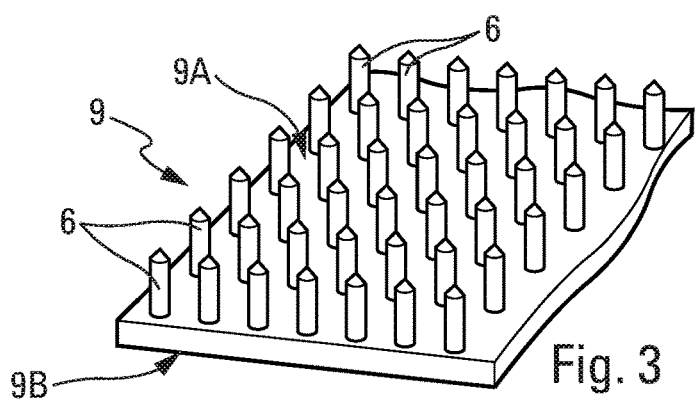
FIG. 3 is a perspective, partial and schematic view of a spacing device.

The spacing device 5 includes at least one plate 9 comprising two faces 9A and 9B, as is represented in FIG. 3. The pins 6 are arranged to project on the face 9A of the plate 9. Preferably, the pins 6, for example made of steel, are fixed to the face 9A, substantially orthogonally with respect to this face 9A.

In a specific embodiment, the pins 6 can be arranged to have a certain flexibility, particularly to facilitate the insertion thereof into the layer assembly 2.

Within the context of the present disclosure, the spacing device 5 can include:
- either a single plate 9, like that represented in FIG. 3;
- or a plurality of such plates 9 arranged, preferably, beside one another.

Figure 4:
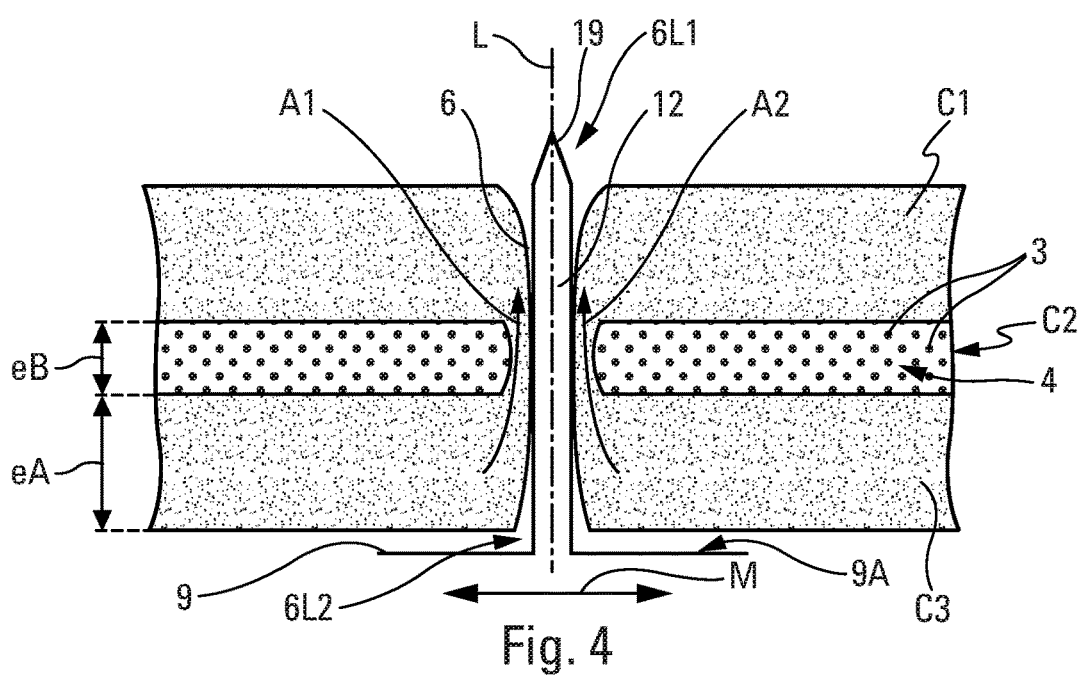
FIG. 4 is a sectional schematic view showing a pin of a spacing device passing through a layer assembly.

As represented by way of illustration in FIG. 4, each of said pins 6 has an elongated shape with a longitudinal axis L. Preferably, this longitudinal axis L is substantially orthogonal with respect to the face 9A of the plate 9, and to a direction M located in the plane of the face 9A and represented by way of illustration in FIG. 4. Each of said pins 6 comprises a longitudinal end 6L2 through which the pin 6 is fixed to the face 9A of the plate 9 and a longitudinal end 6L1 supplied with a point 19. This point 19 facilitates the insertion of the pin 6 into the layer assembly 2. The pin 6 comprises, between the longitudinal ends 6L2 and 6L1, a central shank 12, with a substantially constant cross-section S.

Figure 5A:
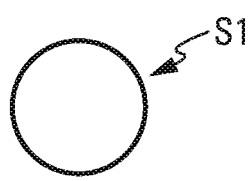
FIGS. 5A, 5B, 5C, 5D, 5E and 5F are schematic views of different cross-sections of pin shanks.
Figure 5B:
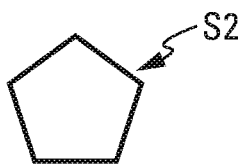
Figure 5C:
Figure 5D:
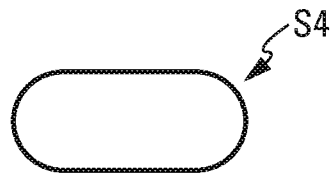
Figure 5E:
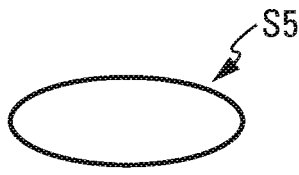
Figure 5F:
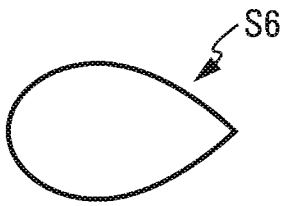

The cross-section S of the shank 12 of said pins 6 can have a variety of different shapes. By way of illustration, the cross-section can have, for example, one of the following shapes represented in FIGS. 5A to 5F:
- a round shape (cross-section S1 of FIG. 5A);
- a polygonal shape, for example a pentagon (cross-section S2 of FIG. 5B) or a star (cross-section S3 of FIG. 5C);
- an oblong shape (cross-section S4 of FIG. 5D);
- an elliptical shape (cross-section S5 of FIG. 5E);
- a water drop shape (cross-section S6 of FIG. 5F).

In a preferred embodiment, the cross-section S of the shank 12 has a surface enclosed in a circle with a diameter of between 0.8 and 1 millimeter.

Each perforation 10 therefore has a shape similar to the cross-section S of the shank 12 of the pin 6 which has produced this perforation 10.

These varied cross-sections S1 to S6 therefore make it possible, by suitably choosing the pins 6, to provide shapes of the perforations 10, that are varied and as desired.

Figure 8:
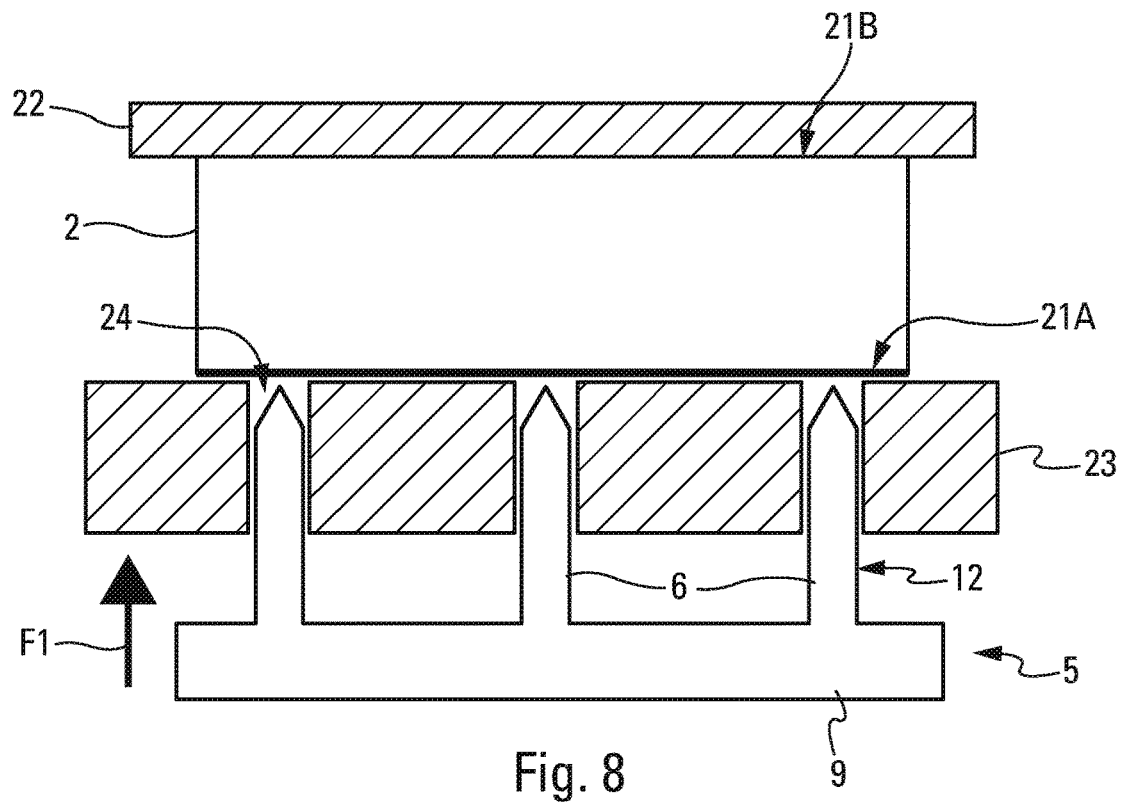
FIG. 8 is a sectional, schematic view showing a first embodiment for fitting a spacing device on a layer assembly.
Figure 9:
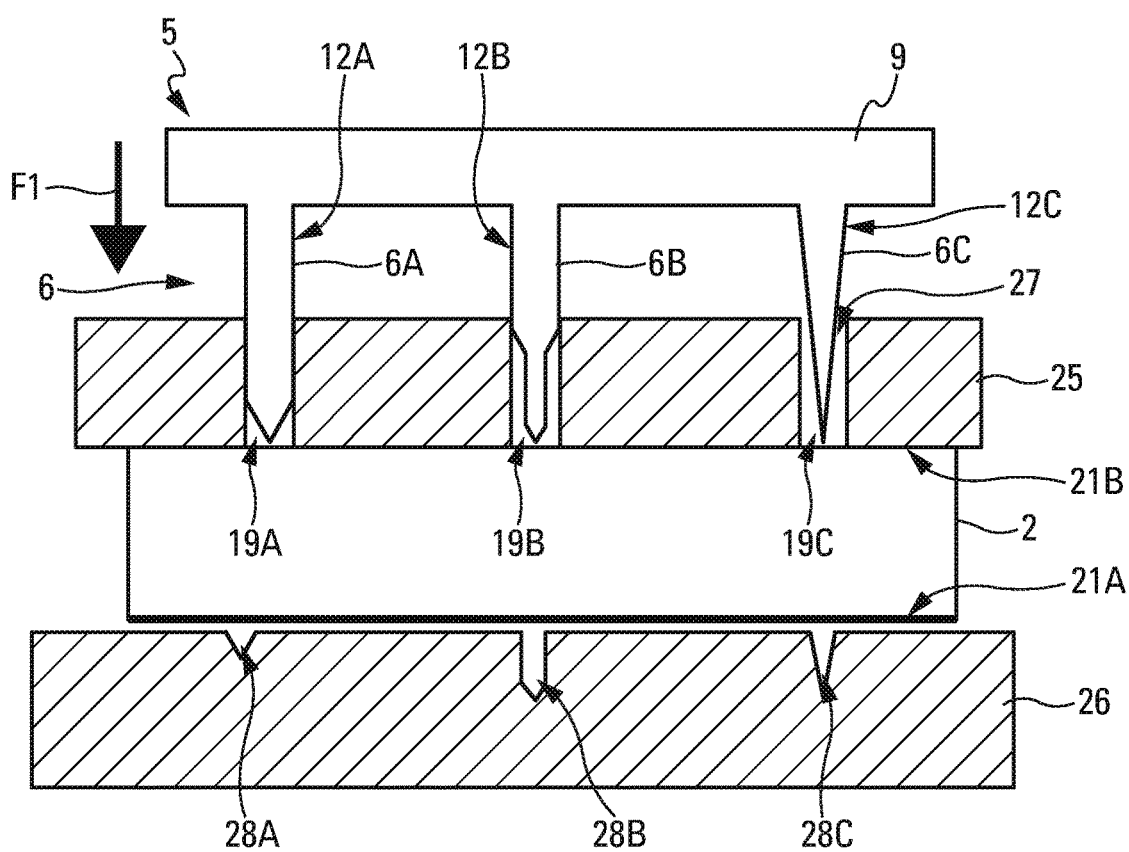
FIG. 9 is a sectional, schematic view showing a second embodiment for fitting a spacing device on a layer assembly.

The layer assembly 2 includes two external faces, namely a so-called aerodynamic face 21A generally intended to come into contact with an aerodynamic flow and a so-called rear face 21B opposite this aerodynamic face 21A, as is represented in FIGS. 8 and 9. The aerodynamic face 21A is represented by a thick line in FIGS. 8 and 9. When implementing the spacing step E2, for the placement of the spacing device 5 on the layer assembly 2 in the direction F1 (FIG. 1B), it can be envisaged to put the pins 6 into the layer assembly 2, either through the aerodynamic face 21A, or through the rear face 21B.

In a first embodiment represented in FIG. 8, the spacing device 5 is configured such that the pins 6 enter through the aerodynamic face 21A into the layer assembly 2. For this purpose, the spacing device 5 includes, in addition to the plate 9 supplied with the pins 6, a bearing tool 22, for example a plate, against which the layer assembly 2 bears via the rear face 21B thereof, and a guide 23 supplied with through-openings 24. The openings 24 have a shape and a diameter that are suited to those of the shank 12 of the pins 6 such as to allow the pins 6 to pass through while providing guiding.

Furthermore, in a second embodiment represented in FIG. 9, the spacing device 5 is configured such that the pins 6 enter through the rear face 21B into the layer assembly 2. For this purpose, the spacing device 5 includes, in addition to the plate 9 supplied with the pins 6, two guides 25 and 26 arranged on either side of the layer assembly 2, on the faces 21B and 21A, respectively. By way of illustration, FIG. 9 represents three different exemplary embodiments of the pins 6A, 6B and 6C.

The guide 25, through which the pins 6A, 6B and 6C are put into the layer assembly 2, is supplied with through-openings 27 with a shape and a diameter that are suited to those of the shank 12 of the pins such as to allow the pins 6A, 6B and 6C to pass through while being used as a guide.

The guide 26 is supplied with blind recesses 28A, 28B and 28C, with a shape and a diameter that are suited to the points 19A, 19B and 19C of the respective pins 6A, 6B and 6C such as to allow the points 19A, 19B and 19C to be inserted into these recesses 28A, 28B and 28C, and then stopped (and thus block the movement of the plate 9 when it moves in the direction F1).

This second embodiment is configured such that the aerodynamic face 21A is only crossed by the point 19A, 19B and 19C of the pins 6A, 6B and 6C (or part of the point thereof) and not by the respective shank 12A, 12B and 12C thereof. Thus, the aerodynamic face 21A has a perforation with a surface area that is reduced with respect to the inside of the layer assembly 2. This makes it possible to reduce possible aerodynamic disturbances at the aerodynamic face 21A and thus reduce drag.

Figure 10C:
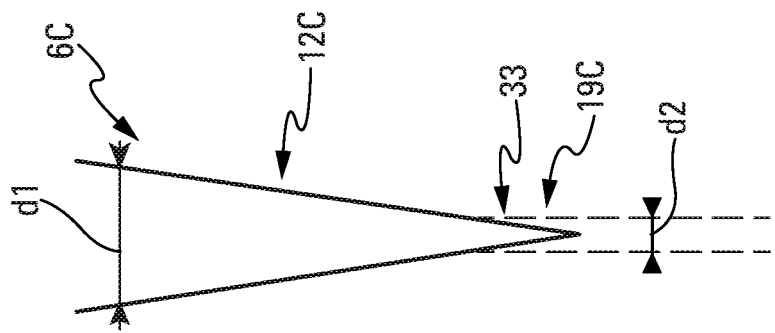
FIGS. 10A, 10B and 10C are partial schematic views of pins, in different embodiments, respectively.
Figure 10B:
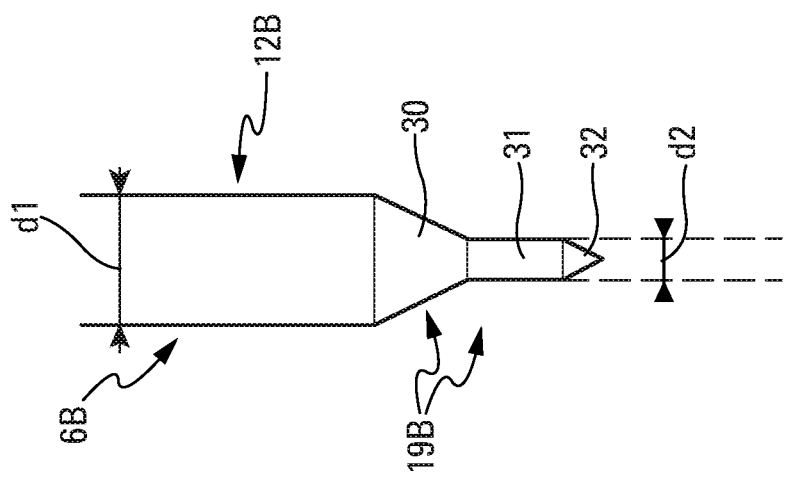
Figure 10A:
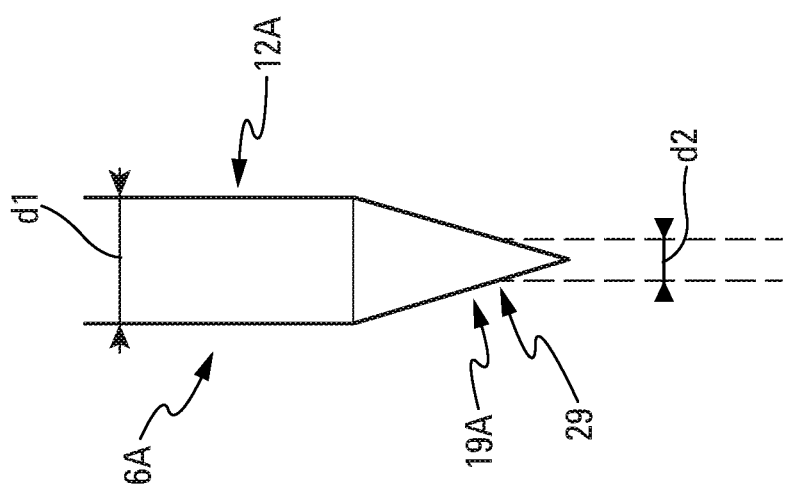

The three different exemplary embodiments of the pins 6A, 6B and 6C shown in FIG. 9 are represented, partially, on an enlarged scale in FIGS. 10A, 10B and 10C, respectively. In the context of the present disclosure, the plate 9 can include a single type of pins or several different types of pins.

The pin 6A comprises a cylindrical shank 12A with a diameter d1 and a conical point 19A, as is shown in FIG. 10A. The spacing device 5 is configured, in relation to the characteristics of the pin 6A, such that the latter pierces the aerodynamic face 21A, longitudinally, at a zone 29 (with a diameter d2 less than the diameter d1) of the conical point 19A thereof.

Furthermore, the pin 6B comprises a cylindrical shank 12B with a diameter d1 and a point 19B, as is represented in FIG. 10B. The point 19B includes a cylindrical segment 31 with a diameter d2, supplied with a pointed end 32. The cylindrical segment 31 is linked to the shank 12B by means of a conical segment 30. The spacing device 5 is configured, in relation to the characteristics of the pin 6B, such that the latter pierces the aerodynamic face 21A with the cylindrical segment 31 having the diameter d2.

Moreover, as represented in FIG. 10C, the pin 6C comprises a conical shank 12C which ends in a point (point 19C), and the diameter of which at the connection to the plate 9 is substantially equal to d1. The spacing device 5 is configured, in relation to the characteristics of the pin 6C, such that the latter pierces the aerodynamic face 21A, longitudinally, at a zone 33 (with a diameter d2) of the point 19C.

In the aforementioned examples, d2 is less than d1 and is, preferably, substantially equal to 0.3×d1. By way of illustration, d1 is substantially equal to 1 mm and d2 is substantially equal to 0.3 mm.

In the spacing step E2, when the pins 6 are put into the layer assembly 2 in the direction F1, since the deicing layer C2 is preferably thin compared to the insulating layer C3, part of the insulating material of the insulating layer C3 will be inserted between the pin 6 and the deicing layer C2, as is illustrated by arrows A1 and A2 in FIG. 4, thus creating an electrical insulation of the entire deicing layer C2.

In the context of the present disclosure, the insulating layer C3, through which the pins 6 are put, has a thickness eA which is greater than the thickness eB of the deicing layer C2, as is shown in FIG. 4. Preferably, the ratio eA/eB is between 1.3 and 3.

Fitting the spacing device 5 thus makes it possible to retain an insulant around the fibers 3 at the perforations 10, and this provides continuity of the deicing function and makes it possible to not have exposed (electrically conductive) fibers 3 at the perforations 10.

The deicing layer C2 can be very fine, since the perforations 10 are discrete and the heat will therefore be diffused over the entire surface. By way of illustration, to deice a jet engine air intake, the necessary thickness of the deicing layer C2 can be approximately 0.1 millimeters. In this example, the two insulating layers C1 and C3 can have a thickness of approximately 0.3 millimeters.

The pins 6 of the spacing device 5 therefore make it possible to pass through the layers C1 to C3 during the manufacturing method, while electrically insulating the electrically conductive fibers 3.

Thanks in particular to the fitting of the spacing device 5, the manufacturing method makes it possible to produce perforations 10 in a simple and effective manner. Furthermore, the manufacturing method makes it possible to produce perforations with a varied shape and/or dimensions and thus obtain a desired open surface proportion on the acoustic skin 1. "Open surface proportion" means the ratio, on a given zone of the acoustic skin, between the total surface area perforated (by said perforations 10) and the total surface area of said zone. By way of illustration, this proportion can, for example, be between 4% and 10%.

Said pins 6 consequently implement functions simultaneously for perforation production, for spacing fibers and for insulant fitting.

By providing an appropriate number of pins 6, it is possible to form all of the perforations, generally several thousand, of the acoustic skin 1 at once.

Each pin 6 can be fixed or slightly flexible in order to facilitate insertion or ejection or other functions. The distribution of the pins 6 can be achieved in a random or ordered fashion particularly as a function of the open surface proportion desired in the various acoustic zones.

In a preferred embodiment, the number and the surface of the cross-section S of the pins 6 on the plate 9 are suitable for creating a number and a size of perforations 10 (and thus particularly a given open surface proportion) in the acoustic skin 1 making it possible to give said acoustic skin 1 a preferred sound absorption in at least one given range of acoustic frequencies.

"Preferred sound absorption" in a considered range of acoustic frequencies means that the acoustic skin 1 has acoustic properties allowing it to effectively absorb noise having frequencies that belong to said considered range of acoustic frequencies, whether or not it can absorb noise having frequencies outside said range.

In a first alternative embodiment of this preferred embodiment, the distribution of the pins 6 on the plate 9, as is represented for example in FIG. 3, is uniform such that all parts of the acoustic skin 1 are configured to absorb the same range or ranges of acoustic frequencies.

Furthermore, in a second alternative embodiment (not represented), of this preferred embodiment, the spacing device 5 includes at least two different zones. The number and the surface of the cross-section of the pins on a first of said zones are suitable for giving a first part of the acoustic skin a preferred sound absorption in at least one first range of acoustic frequencies, and the number and the surface of the cross-section of the pins on the second of said zones are suitable for giving a second part of the acoustic skin a preferred sound absorption in at least one second range of acoustic frequencies, said second range of acoustic frequencies being different to said first range of acoustic frequencies.

It is thus possible to provide various zones of the acoustic skin 1 (and of an acoustic panel including it, as specified below) which are each suitable for absorbing noise of specific frequencies. This second alternative embodiment is particularly advantageous when there are different sources of noise, having different frequencies and located at different places. The acoustic skin 1 is then configured and placed such that each of these zones is located as close as possible to the noise source that it must attenuate.

Then, in the baking step E3, the assembly 7 formed from the layer assembly 2 and from the spacing device 5 is subjected, conventionally, to baking, in order to polymerize the layer assembly 2.

In the context of the present disclosure, the layers can be joined together in various conventional ways (for example by "curing", "bonding", "co-curing", "co-bonding", etc.) that are not described in greater detail in the present description.

Finally, the withdrawal step E4 includes producing a relative movement between the spacing device 5 and the layer assembly 2, in order to separate them from one another such as to obtain the situation represented in FIG. 1D.

For this purpose, in a preferred embodiment, the conventional movement unit (not represented) moves the spacing device 5 away from the layer assembly 2 which is immobile, as is illustrated by an arrow F2 in FIG. 1D. In an alternative, it can also be envisaged that the movement unit moves the layer assembly 2 away from the spacing device 5 which is immobile.

Moreover, in the context of the present disclosure, the acoustic skin 1 (and if necessary all or some of the acoustic panel which includes it) can be planar, as represented in FIG. 2, or curved (single or double curvature, convex and/or concave).

The manufacturing method, as described above, has many advantages. It particularly makes it possible to:
- manufacture an acoustic panel 1 which has a double function (for acoustic attenuation and for deicing);
- produce perforations 10 in a simple and effective manner. The manufacturing method makes it possible to produce perforations with a varied shape and/or dimensions and thus to vary the open surface proportion and the shape of the perforations on the same acoustic skin 1, and this particularly makes it possible to optimize the acoustic attenuation function;
- reduce the manufacturing time;
- retain an insulating element around the electrically conductive fibers 3 at the perforations 10, and this provides continuity of the deicing function and makes it possible to not have exposed fibers 3.

Figure 6:
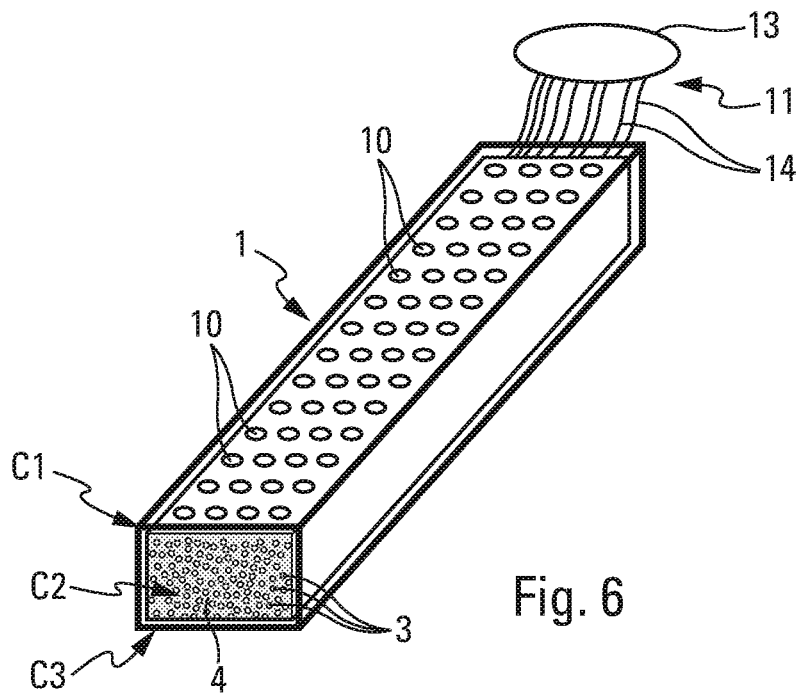
FIG. 6 is a perspective, schematic view of a deicing acoustic skin connected to an electric current source.

To implement the deicing function, the (electrically conductive) fibers 3 of the acoustic skin 1 are joined by connections 14 to an electrical source (or supply) 13 of the deicing (or heat generating) system 11, as represented schematically in FIG. 6. This deicing system 11 makes it possible to achieve deicing by Joule effect.

Figure 7:
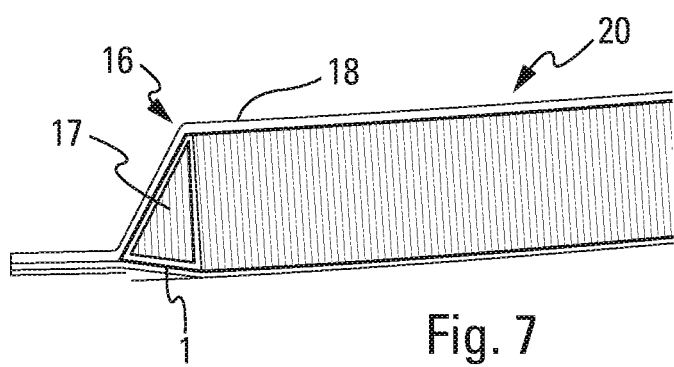
FIG. 7 is a sectional, partial and schematic view of an acoustic panel supplied with a deicing acoustic skin.

In a preferred use, the manufacturing method, as described above, is used in a process for manufacturing an acoustic panel 20, like that represented schematically and partially in a specific embodiment in FIG. 7.

Conventionally, this acoustic panel 20 comprises an acoustic structure 16 which can absorb noise in order to attenuate it. This acoustic structure 16 includes, as represented in FIG. 7:
- a cellular structure 17, in particular as honeycomb;
- an acoustic (or resistive) skin 1 which is a deicing skin, such as that described above; and
- a so-called backing skin 18, that is reflective in the cellular zone, in order to close the acoustic panel 20. This backing skin 18 is not perforated, except for possibly locally for water drainage reasons.

The acoustic skin 1 and the backing skin 18 are arranged and fixed on the cellular structure 17.

The sound absorption is achieved via the acoustic skin 1. In some embodiments, the cellular structure 17 can contribute to the sound absorption.

Generally, the acoustic panel 20 is placed such that the acoustic skin 1 is positioned in proximity and preferably close (or opposite) to the source of noise to be attenuated. The acoustic skin 1 is arranged closer to the source of noise than the backing skin 18.

If the acoustic skin 1 is aerodynamic, i.e. if it is in contact with the air flow, the surface of the acoustic skin 1 is arranged in the flow bed. The backing skin 18 can also be aerodynamic (in contact with the aerodynamic flow) depending on the configurations and the installation of the acoustic panel 20 on the aircraft. The backing skin 18 particularly has the function of ensuring the structural performance of the acoustic structure 16.

In a first (preferred) embodiment, the manufacturing process includes at least the plurality of following successive operations:
- an operation for manufacturing the acoustic skin 1, by implementing the manufacturing method described above;
- a conventional operation for manufacturing the cellular structure 17;
- a conventional operation for manufacturing the backing skin 18; and
- a conventional step for fixing the acoustic skin 1 and the backing skin 18 on the cellular structure 17.

Furthermore, in a second embodiment, the manufacturing process is based on the aforementioned manufacturing method and is such that:
- the manufacturing step E1 (FIG. 1A) of the manufacturing method involves manufacturing a single-piece assembly comprising a cellular structure 17, a backing skin 18 and an acoustic skin 1 (FIG. 7), said acoustic skin 1 corresponding to said layer assembly 2; and
- the baking step E3 (FIG. 1C) of said manufacturing method includes baking the resulting single-piece assembly in order to obtain the acoustic structure 16 which is made of a single piece.

In a preferred use (not represented), the acoustic panel 20, manufactured in this manner, is intended to allow the reduction of noise on a nacelle (not represented) of a propulsion assembly (or jet engine) of an aircraft. The acoustic panel 20 is arranged in the air intake of the propulsion assembly. In this preferred use, the acoustic panel 20 also implements a deicing function, thanks to said acoustic skin 1 which is a deicing acoustic skin.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of manufacturing a deicing acoustic skin, comprising:
    manufacturing a layer assembly comprising a plurality of stacked layers, the layer assembly comprising at least one deicing layer and two insulating layers arranged on either side of the deicing layer, the deicing layer comprising electrically conductive fibers embedded in a resin;
    a spacing step comprising fitting a spacing device on the layer assembly, the spacing device comprising a plurality of pins, the fitting of the spacing device comprising passing said pins through said layer assembly, wherein, during the spacing step, one of the insulating layers is inserted between each pin and the deicing layer to electrically insulate the electrically conductive fibers from the acoustic perforations;
    a baking step comprising submitting the assembly formed from the layer assembly and from the spacing device to baking, in order to polymerize the layer assembly; and
    a withdrawal step comprising removing the spacing device from the polymerized layer assembly such as to obtain an acoustic skin supplied with a plurality of perforations, said perforations being produced at the locations of the pins after the withdrawal of the spacing device,
    wherein an insulant is retained around the electrically conductive fibers at each of the plurality of perforations such that none of the electrically conductive fibers at each of the plurality of perforations is exposed after the withdrawal step.

2. The method as claimed in claim 1, wherein the spacing device comprises at least one plate comprising two faces, said plurality of pins being arranged to project on one of said faces of the plate.

3. The method as claimed in claim 2, wherein each of said pins has an elongated shape comprising a first longitudinal end through which the pin is fixed to the plate and a second longitudinal end supplied with a point, and in that each of said pins comprises, between the first and second longitudinal ends, a shank having a substantially constant cross-section.

4. The method as claimed in claim 3, wherein, for at least some of said pins, the cross-section of the shank has a surface enclosed in a circle with a diameter of between 0.8 and 1 millimeter.

5. The method as claimed in claim 3, wherein, for at least some of said pins, the cross-section of the shank has one of the following shapes: round, polygonal, elliptical, oblong, water drop-shaped.

6. The method as claimed in claim 1, wherein the layer assembly includes an auxiliary layer supplied with a mesh.

7. The method as claimed in claim 1, wherein the fibers of the deicing layer are made of carbon.

8. The method as claimed in claim 2, wherein the number and the surface of the cross-section of the pins on the plate are suitable for creating a number and a size of perforations in the acoustic skin making it possible to give said acoustic skin a preferred sound absorption in at least one given range of acoustic frequencies.

9. The method as claimed in claim 8, wherein the spacing device includes at least two different zones, in that the number and the surface of the cross-section of the pins on a first of said zones are suitable for giving a first part of the acoustic skin a preferred sound absorption in at least one first range of acoustic frequencies, and in that the number and the surface of the cross-section of the pins on the second of said zones are suitable for giving a second part of the acoustic skin a preferred sound absorption in at least a second range of acoustic frequencies, said second range of acoustic frequencies being different to said first range of acoustic frequencies.

10. The method as claimed in claim 1, wherein the spacing step comprises producing perforations having a cross-sectional area at an aerodynamic surface that is less than a cross-sectional area of the perforations within an interior of the layer assembly.

11. The method as claimed in claim 1 wherein a ratio of the thickness of the first insulating layer to the thickness of the deicing layer is between 1.3 and 3.

12. The method as claimed in claim 1, further comprising the step of connecting the deicing layer to an electrical source to achieve deicing by Joule effect.

* * * * *